US010333695B2

(12) United States Patent
Laine et al.

(10) Patent No.: US 10,333,695 B2
(45) Date of Patent: Jun. 25, 2019

(54) RATIONAL NUMBER ARITHMETIC IN HOMOMORPHIC ENCRYPTION

(71) Applicant: Microsoft Technology Licensing, LLC, Redmond, WA (US)

(72) Inventors: Kim Laine, Seattle, WA (US); Rachel Louise Player, Rickmansworth (GB); Hao Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 15/348,918

(22) Filed: Nov. 10, 2016

(65) Prior Publication Data

US 2018/0131506 A1    May 10, 2018

(51) Int. Cl.
  *H04L 9/00*  (2006.01)
  *H04L 9/06*  (2006.01)
  *G06F 21/60* (2013.01)

(52) U.S. Cl.
  CPC ........... *H04L 9/008* (2013.01); *G06F 21/602* (2013.01); *H04L 9/0618* (2013.01); *H04L 2209/34* (2013.01)

(58) Field of Classification Search
  CPC ...... H04L 9/008; H04L 9/0618; G06F 21/602
  USPC ........................................................ 380/255
  See application file for complete search history.

(56) References Cited

U.S. PATENT DOCUMENTS 8,843,762 B2   9/2014   Troncoso Pastoriza et al.
8,862,895 B2   10/2014  Rieffel et al.
2012/0039473 A1*  2/2012  Gentry ............... H04L 9/008
                                          380/277
2014/0177828 A1*  6/2014  Loftus ............... H04L 9/008
                                          380/44
2015/0010147 A1*  1/2015  Takashima ......... H04L 9/3073
                                          380/44
2015/0358153 A1   12/2015  Gentry
2016/0191233 A1   6/2016   Loftus et al.
2017/0366358 A1*  12/2017  Lyubashevsky ...... H04L 9/3255

OTHER PUBLICATIONS

Chen et al., "Simple Encrypted Arithmetic Library—SEAL v2.1," available at: https://www.microsoft.com/en-us/research/wp-content/uploads/2016/09/sealmanual-2.pdf, pp. 1-27 (Sep. 30, 2016).
Costache et al., "Fixed-Point Arithmetic in SHE Schemes," available at: https://eprint.iacr.org/2016/250, pp. 1-22 (Sep. 25, 2016).
Fouque et al., "CryptoComputing with Rationals," *Financial Cryptography*, pp. 136-146 (Mar. 11, 2002).

(Continued)

*Primary Examiner* — Michael S McNally
*Assistant Examiner* — Moeen Khan
(74) *Attorney, Agent, or Firm* — Klarquist Sparkman, LLP (57) ABSTRACT

Homomorphic encryption systems encode plaintext represented as rational numbers based on modular products of the rational numbers and a power of an integer basis with respect to a modulus defined by the integer basis. Decrypted ciphertexts are decoded based on modular products of the decrypted ciphertexts and an integer power of the integer basis. Typically, the integer power is one-half the number of available digits if the integer basis is odd; if the integer basis is even, the integer power is one-half the number of available digits plus one.

22 Claims, 9 Drawing Sheets

(56) References Cited

OTHER PUBLICATIONS

International Search Report and Written Opinion from International Application No. PCT/US2017/060646, dated Feb. 2, 2018, 14 pages.
Brakerski, "Fully Homomorphic Encryption without Modulus Switching from Classical GapSVP," *CRYPTO 2012*, 7417:868-886, (2012).
Dowlin et al., "Manual for Using Homomorphic Encryption for Bioinformatics," pp. 1-16 (Nov. 13, 2015).
Fan et al., "Somewhat Practical Fully Homomorphic Encryption," *Cryptology ePrint Archive*, pp. 1-19 (2012).
Geihs et al., "Efficient Integer Encoding for Homomorphic Encryption via Ring Isomorphisms," *LATINCRYPT 2014*, 8895:48-63 (2015).
Lepoint et al., "A Comparison of the Homomorphic Encryption Schemes FV and YASHE," *Progress in Cryptology—AFRICACRYPT 2014*, 8469:318-335 (2014).

\* cited by examiner

RATIONAL NUMBER ARITHMETIC IN HOMOMORPHIC ENCRYPTION

FIELD

The disclosure pertains to homomorphic encryption systems.

BACKGROUND

Homomorphic encryption systems have the potential to permit users and cloud service providers to interact without loss of confidentiality. For example, a medical professional can forward a request to a cloud based medical service provider for analysis of patient medical data. Without decrypting sensitive patient personal information in the request, the service provider can supply information requested. The service provider can add analytical results to the encrypted data, and return the encrypted data to the medical professional. At no time does the service provider have access to patient personal information.

While offering numerous advantages, homomorphic encryption systems exhibit significant limitations. In some homomorphic encryption systems, computations are unacceptably slow, or require excessive computational power. Homomorphic encryption systems also typically exhibit so-called "noise" so that encrypted data acquires noise during processing, and eventually can be corrupted unacceptably. In some homomorphic encryption schemes, the use of rational numbers as plaintexts is problematic due to difficulties in representing fractional parts of the plaintext representations. While some approaches have been developed, they tend to be overly complex, and do not ensure that representations remain suitable for all plaintexts.

SUMMARY

Homomorphic encryption systems encode rational number plaintexts as integers modulo $b^N+1$, wherein b is an integer base and N is a number of available digits. This encoding is injective with respect to conventional polynomial encodings, but avoids problems associated with scaling rational numbers to integers. After encoding, a plaintext as encoded can be processed based on encryption system procedures associated with integers, as the encoded plaintext will be an integer. When processing of a ciphertext is complete, the ciphertext can be decrypted and then decoded to return a plaintext. Typically, a plaintext encoding as an integer modulo $b^N+1$ is further processed to produce a corresponding polynomial representation that is then used for encryption. Decryption processes can produce a polynomial representation that can be decoded. Decoding processes depend on whether the base b is an odd or even integer.

Typically, a plaintext is represented as a rational number x which is encoded based on a modular product of the rational number x and $b^N$ with respect to a modulus $b^N+1$, wherein N is a power of 2 and b is a positive integer basis. In some cases, the rational number is an approximation to an exact value associated with a plaintext. The encoded rational number is then represented as a polynomial and homomorphically encrypted. A received ciphertext is decrypted and then decoded to produce a plaintext based on a modular product of the decrypted (but still encoded ciphertext) with a power of the base b which is then divided by the power of the base b. If the base b is even, the power of the base b can be N/2−1; if odd, the power of the base b can be N/2.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. In some cases, elements are referred to as "directly coupled" so as to exclude intermediate elements.

The systems, apparatus, and methods described herein should not be construed as limiting in any way. Instead, the present disclosure is directed toward all novel and nonobvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

In the disclosed examples, homomorphic encryption systems are described at both the encryption and decryption sides. Encryption and decryption need not be performed by the same system or at a common location, unless indicated. Some example encodings and decodings are illustrated using relatively small numbers using representations in which only a small number of digits are to be used with a particular integer basis. Such examples are to facilitate understanding; it will be appreciated by those of ordinary skill in the art that the disclosed methods and apparatus pertain to system implementations that require digital or other processing hardware as values encountered in encryption/decryption systems are generally substantial. In some cases, an encrypted plaintext (referred to herein as a "ciphertext") is transmitted to a service provider or other destination for subsequent homomorphic processing which can add additional content to the ciphertext. The processed ciphertext need not be returned to the initial location for decryption but can be partially or fully decrypted at other locations. Typically, locations (referred to herein as "nodes" or "network nodes") are arranged to provide both encryption and decryption. The communication of encrypted values can use wired or wireless communication methods. The terms "encode" and "decode" are used herein to refer to mapping of message text or plaintext to a plaintext space; as such, encoding and decoding may provide little security but facilitate encryption and decryption.

In the following examples, plaintext representations within a number of digits N in a base b are described, wherein N is a positive power of two and b is a positive integer. These parameters can be predetermined or can be selectable as needed. N need not be a power of two, but can be any positive integer greater than 1, and b can be negative, or any integer other than 0 and 1. While it is convenient to encrypt and decrypt using the same parameters, different values can be used for encryption and decryption, and not all encryption systems are required to use common values. In the examples, plaintexts are represented exactly as rational numbers for convenient illustration. However, plaintexts can be represented as rational numbers based on approximations, or by limiting a number of available digits for fractional or integer parts of the plaintext representation. In the following discussion, encoding refers to processing plaintext so as to map the plaintext to a suitable set of values $\mathbb{Z}$ that can then be encrypted and decoding refers to processing decrypted representations of plaintext so as to map the plaintext to a suitable set of values for output. The disclosed approaches permit simpler, faster processing of plaintext expressed as rational numbers.

Figure 1:
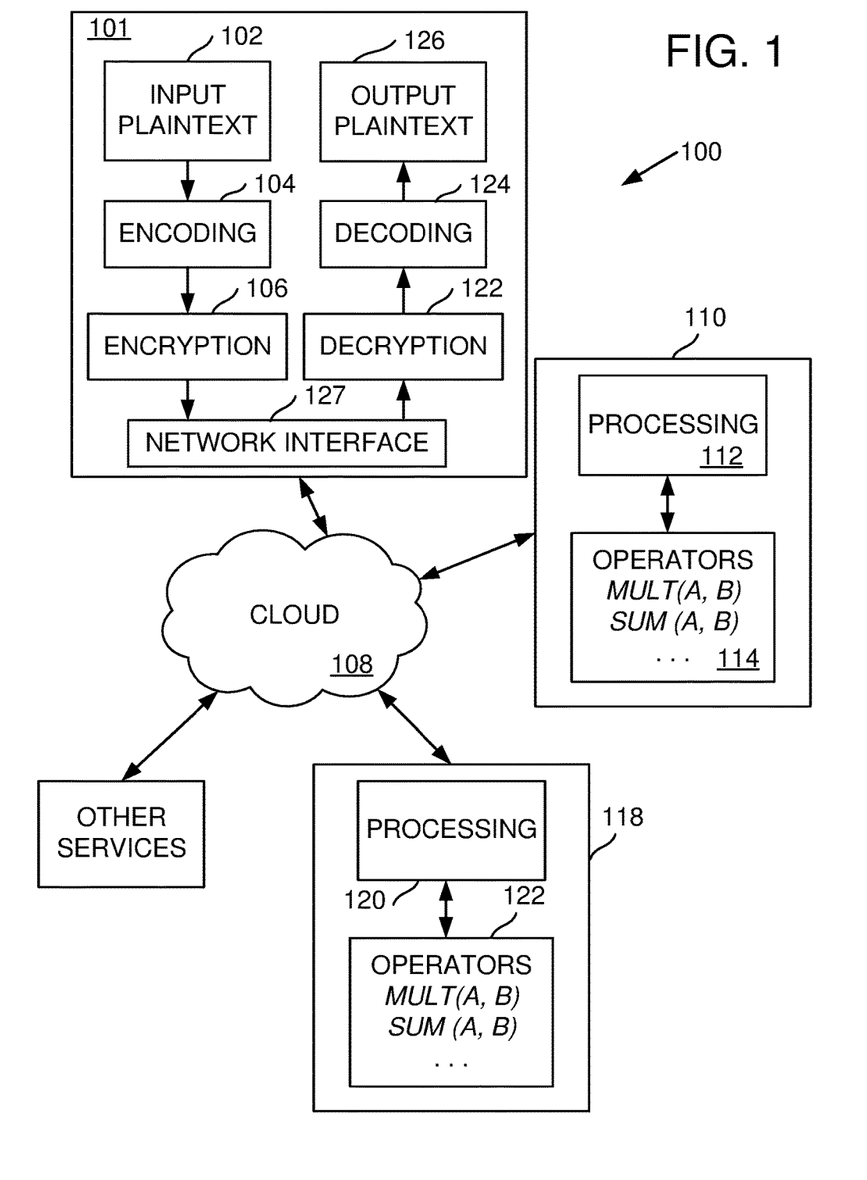
FIG. 1 is a block diagram of a representative homomorphic encryption system using a plaintext space $M = \mathbb{Z}/(b^n+1)\mathbb{Z}$, wherein n is a power of 2 and b is a positive integer base.

Referring to FIG. 1, a communication system 100 that provides homomorphic encryption/decryption includes a communication device 101 that includes an input 102 for plaintext, an encoder 104, and an encryptor 106 coupled to produce and output encrypted text ("ciphertext") based on a plaintext. Typically, the ciphertext is communicated via a wide area network 108 such as a cloud network or a local area network, or other public or private network. The ciphertext from the communication device 101 can be provided to a one or more service providers 110, 118 or other destinations that can include processors 112, 120 that operated on the ciphertext based on one more operations 114, 122 such as multiplication, division, addition, subtraction that can be applied to the ciphertext. The processed ciphertext is coupled by the service providers 110, 118 via the network to a suitable destination, and, in some cases, back to the device 101. The device 101 can be a mobile device, a tablet device, a dedicated workstation, a lap top or other device. For example, the device 101 can be a mobile device that communicates encrypted patent data to a networked workstation at a medical service provider that returns processed encrypted patent data to the patient or a patient's physician.

The communication device 101 generally includes a user interface that receives an input plaintext that is then coupled to be encoded as discussed below using processor-executable instructions stored in a memory portion 104. Encoded plaintext is then encrypted based on processor-executable instructions stored in a memory portion 106, and the resulting ciphertext is communicated with via a network interface 127 such as an Ethernet connection, a wireless network interface (such as a WIFI controller), or other wired or wireless transceiver. Ciphertext is typically received by the communication device 101 by the network interface 127, decrypted based on processor-executable instructions stored in a memory portion 122, decoded with processor-executable instructions stored in a memory portion 124, and stored as plaintext in a memory portion 126 for output on a display, printer, or other device.

Figure 2:
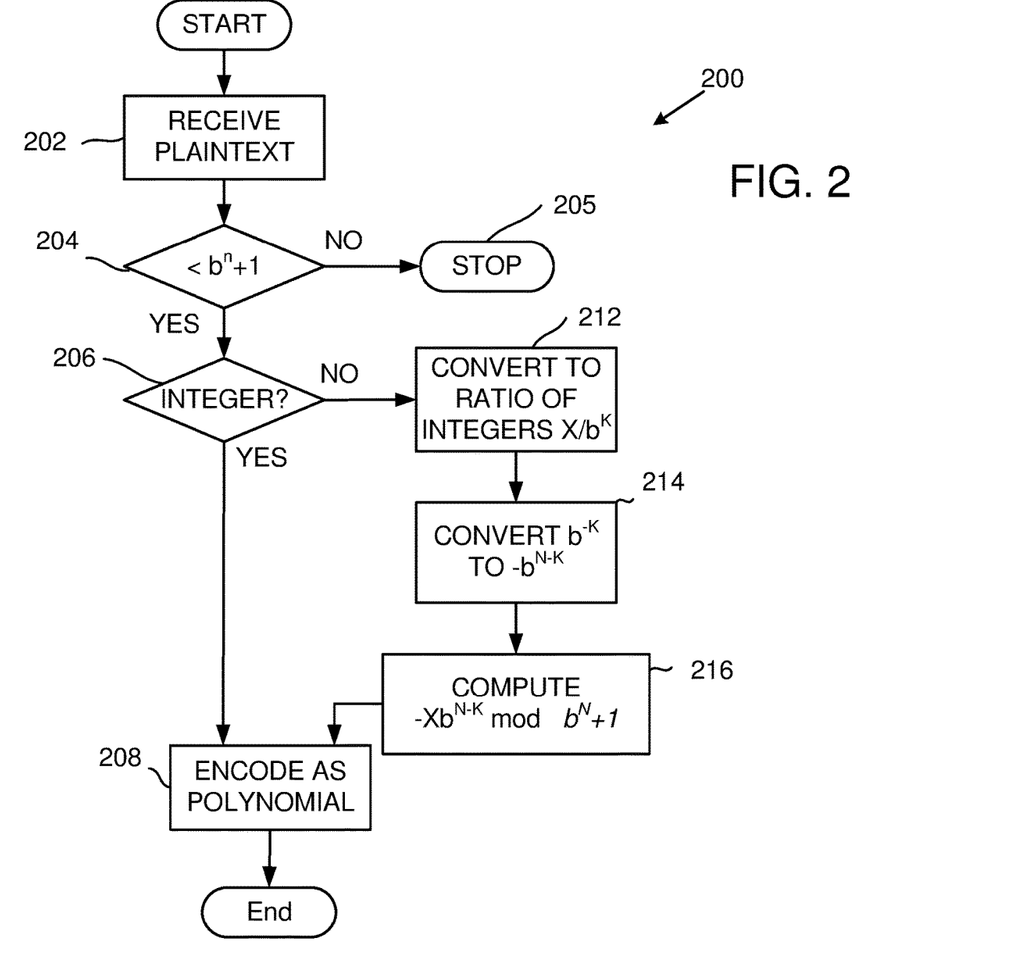
FIG. 2 illustrates a method of encoding a plaintext in $M = \mathbb{Z}(b^n+1)\mathbb{Z}$.

With reference to FIG. 2, a representative method 200 of encoding and homomorphically encrypting a plaintext includes receiving a plaintext at 202. At 204, a numerical representation of the plaintext is compared to a sum $b^n+1$, wherein n is a number of digits permitted for representing a number in an integer base b, wherein n is a power of two. If the representation requires more bits than available, processing stops at 205, and an error message or other warning provided. If the plaintext is an integer as determined at 206, processing continues to 208 at which the plaintext is represented as a polynomial of order n. If the plaintext is a non-integer rational number having K fractional digits, at 212, the plaintext is converted to a ratio of the form $X/b^K$, wherein X and K are integers, and K refers to a number of digits in a fractional part of X in base b. At 214, $b^{-K}$ is assigned a value $-b^{N-K}$ and at 216, $-Xb^{N-K}$ mod $b^N+1$ is calculated, to determine an encoded value that is the result further encoded as a polynomial at 208.

Figure 3A:
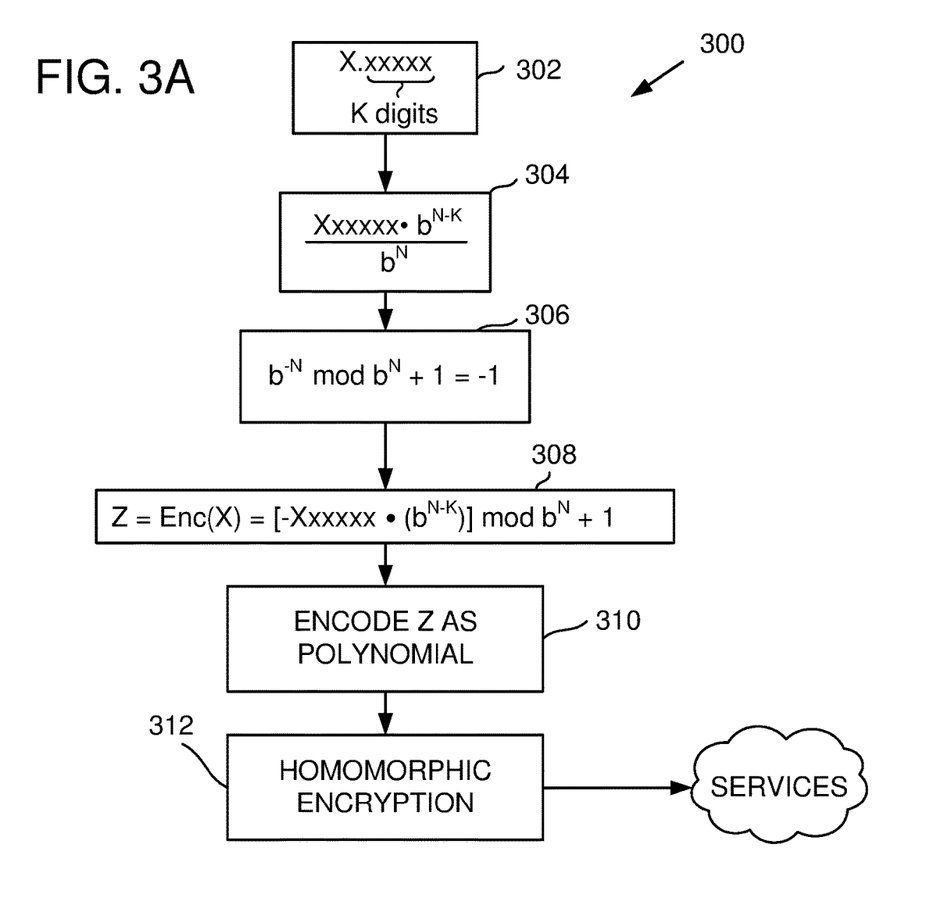
FIGS. 3A-3B illustrates a representative encoding of a rational number into the plaintext space $M = \mathbb{Z}/(b^n+1)\mathbb{Z}$.

While the method of FIG. 2 can be used, it is inconvenient to encode based on a determination of a number of fractional digits associated with plaintext. Different plaintexts may then be encoded differently, and it may be necessary to communicate how a plaintext was encoded for successful plaintext recovery. Referring to FIG. 3A, a method 300 includes representing a plaintext X (shown as X.xxxxx so that processing of any fractional part is explicit) at 302 as a base b number having K fractional digits in base b. At 304, the plaintext is multiplied by $b^N/b^N$; at 306 it is noted that $b^{-N}$ mod $b^N+1=-1$ so that at 308, an encoding Z of the plaintext X is provided as:

$$Z=Enc(X)=[-Xxxxxx \cdot b^{N-K}] \bmod b^N+1.$$

At 310, Z is encoded as a polynomial, and at 312, the polynomial is used in homomorphic encryption. After encryption, ciphertext can be provided to a service provider or other destination.

Figure 3B:
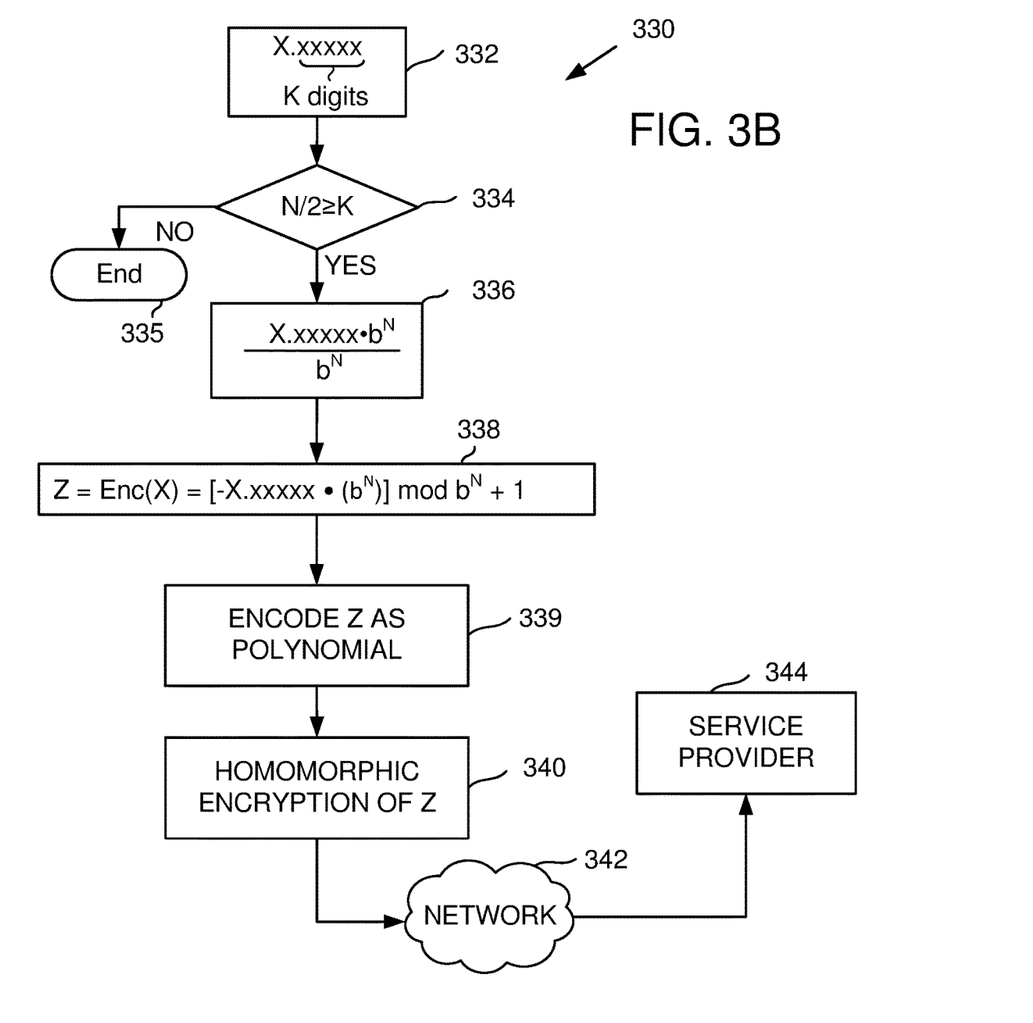

FIG. 3B illustrates method 330 that is similar method to that of FIG. 3A. At 332, a plaintext represented as a rational number with K fractional digits is selected, and at 334, the number of fractional digits K is compared with N/2 (i.e., one-half the number of available digits). If K is too large, processing halts at 335 as the plaintext has more fractional digits than can be accommodated. At 336, the plaintext is multiplied by $b^N/b^N$; at 338 it is encoded as:

$$Z=Enc(X)=[-X.xxxxx \cdot b^N] \bmod b^N+1.$$

At 339, Z is encoded as a polynomial and encrypted at 340. Encrypted plaintext is transmitted via a network 342 to one or more destinations, such as service provider 344.

Figure 3C:
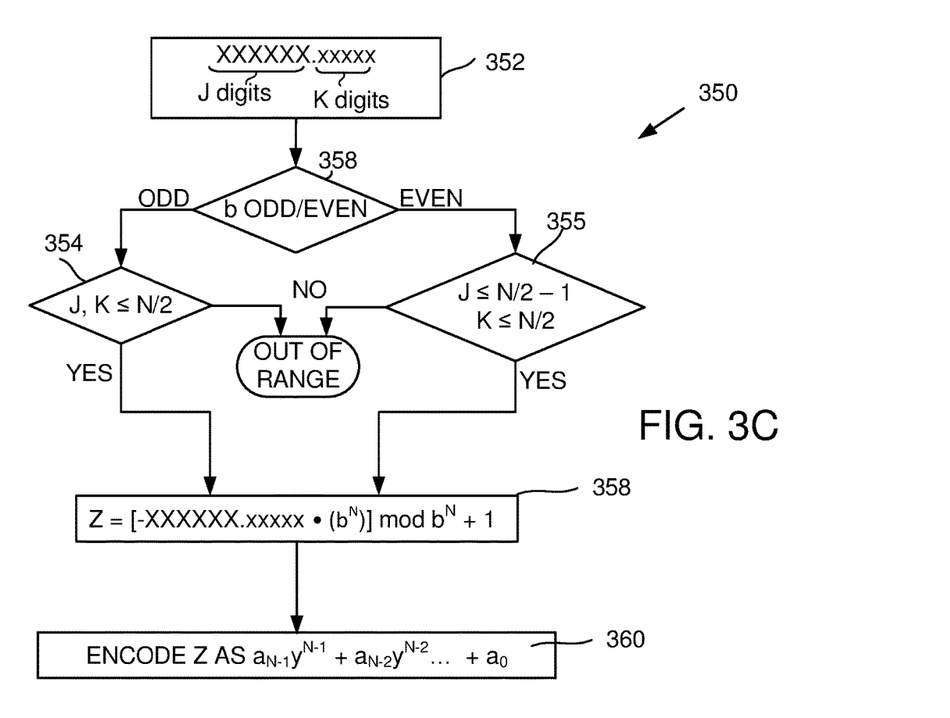
FIG. 3C illustrates a representative method of encoding of a rational number into the plaintext space $M = \mathbb{Z}/(b^n+1)\mathbb{Z}$, for even and odd values of the base b.

In some cases, the integer base b can be selected depending on user requirements, and either even or odd values can be used. FIG. 3C illustrates a method 350 that encodes plaintext 352 having J integer digits and K fractional digits based on a determination of whether the base b is odd or even at 358. For b odd, at 354, J and K are evaluated to verify that each is less than or equal to N/2; for b even, at 355, J and K are evaluated to verify that K is less than or equal to N/2 and J is less than or equal to N/2−1. Of course, other choices are possible, but it is necessary to confirm that all digits (integer and fractional) of a plaintext can be fitted into N digits in base b. At 358, the plaintext is encoded as a base b number, and at 360, the base b number is encoded as a polynomial. The polynomial encoding is straightforward after the encoding operations described above. There are no fractional portions to encode, and the encoded number to be rendered as a polynomial is guaranteed to be representable as a polynomial of order N−1. At 512, a polynomial representation corresponding to Z encoded as at 508 is shown. The polynomial is shown as a polynomial of order 7 in a variable y, wherein coefficients of each of the terms are less than b.

Figure 4:
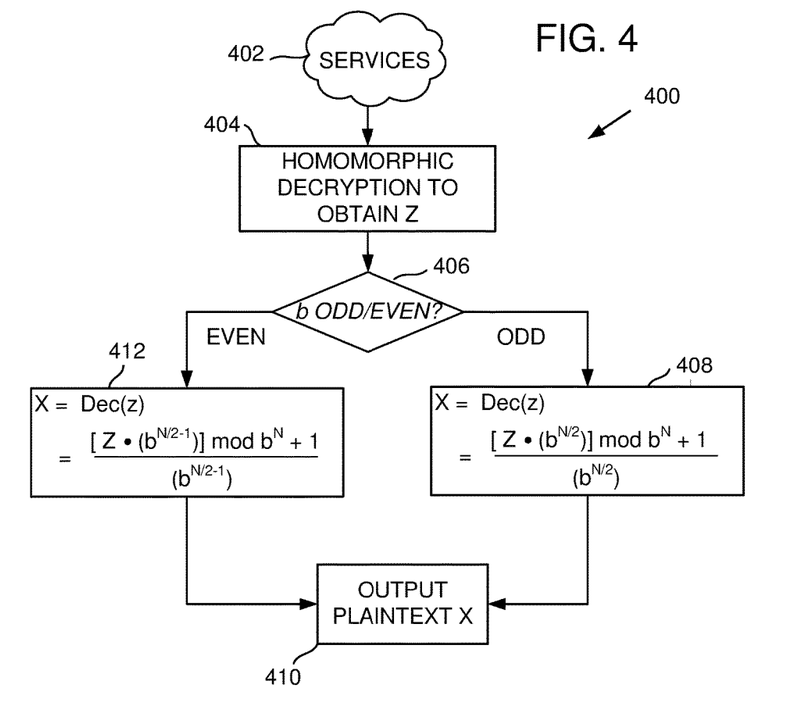
FIG. 4 illustrates a representative method of decoding a decrypted ciphertext into the plaintext space $M = \mathbb{Z}/(b^n+1)\mathbb{Z}$, for even and odd values of the base b.

A method 400 of decoding is illustrated in FIG. 4. At 402, processed ciphertext is produced and homomorphically decrypted at 404 to obtain encoded (but unencrypted) plaintext Z. At 406, the integer base b is evaluated to determine if it is even or odd. If even, at 412, plaintext X=Dec(Z) is returned as:

$$X = Dec(Z) = \frac{[Z \cdot b^{N/2-1}] \bmod b^N + 1}{b^{N/2-1}}.$$

If odd, at 408, plaintext X=Dec(Z) is returned as:

$$X = Dec(Z) = \frac{[Z \cdot b^{N/2}] \bmod b^N + 1}{b^{N/2}}.$$

At 410, the decoded plaintext is output.

Figure 5:
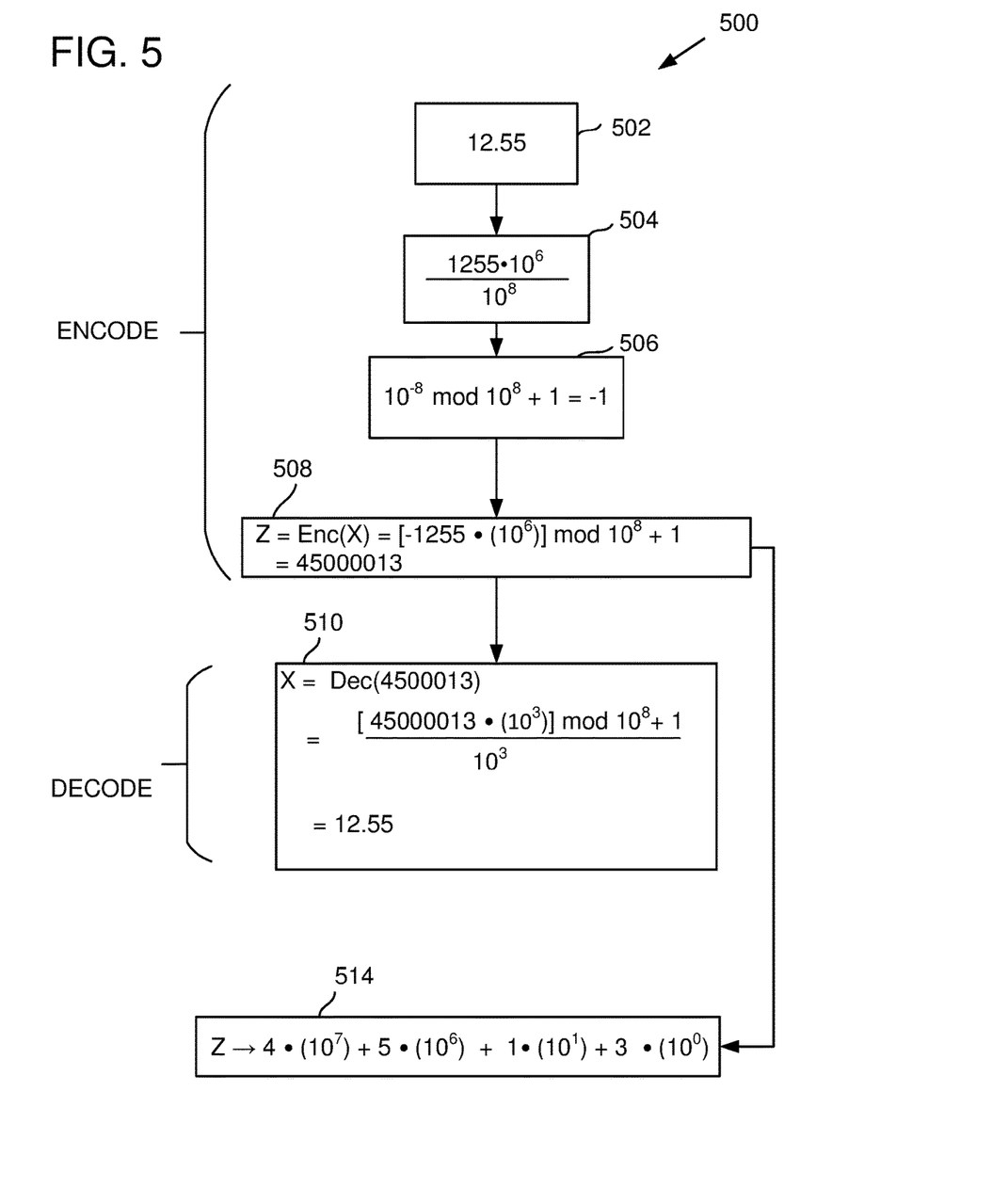
FIG. 5 illustrates encoding of a representative rational number and decoding of the encoded number with an even base b.

FIG. 5 illustrates encoding a rational number (12.55) using N=8 digits in base b=10 (i.e., an even base). At 502, the number is represented with integer and fractional parts. At 504, the number is multiplied by $10^8/10^8$; using $10^{-8}$ mod $10^8+1=-1$ at 506, the encoding Z(X) is determined at 508. Decoding of Z is shown at 510.

Figure 6:
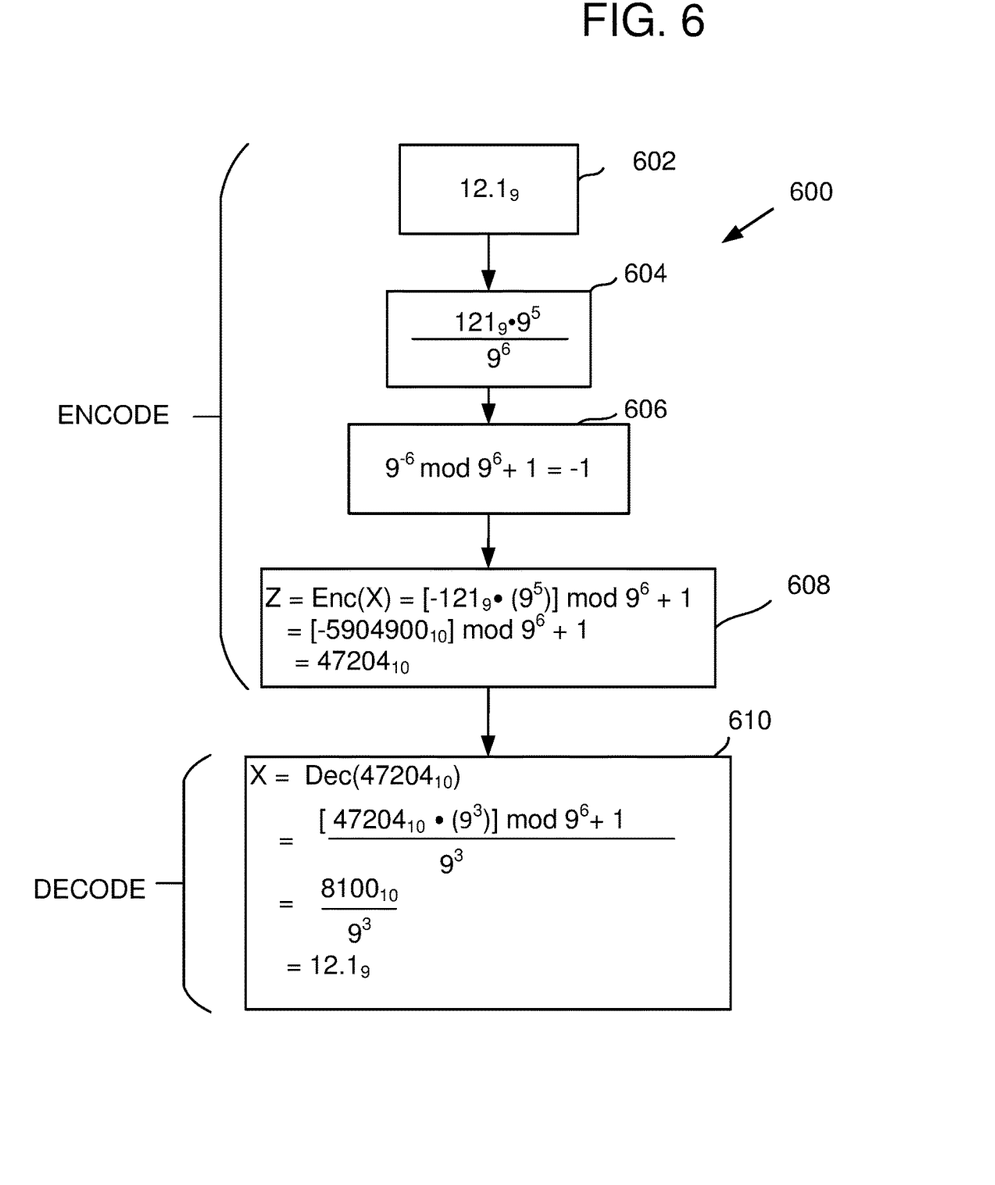
FIG. 6 illustrates encoding of a representative rational number and decoding of the encoded number with an odd base b.

FIG. 6 illustrates encoding a rational number 12.1 in base 9 using 6 digits (odd base, N=6, b=9). The number is shown at 602, expressed in base 9 so that 0.1=1/9. At 605, the number is multiplied by $9^6/9^6$ and Z is shown as encoded (in base 10) at 608, wherein the relationship $9^{-6}$ mod $9^6+1=-1$ shown as 606 is used. Z is decoded at 610 as prescribed above to return the original value 12.1.

Figure 7:
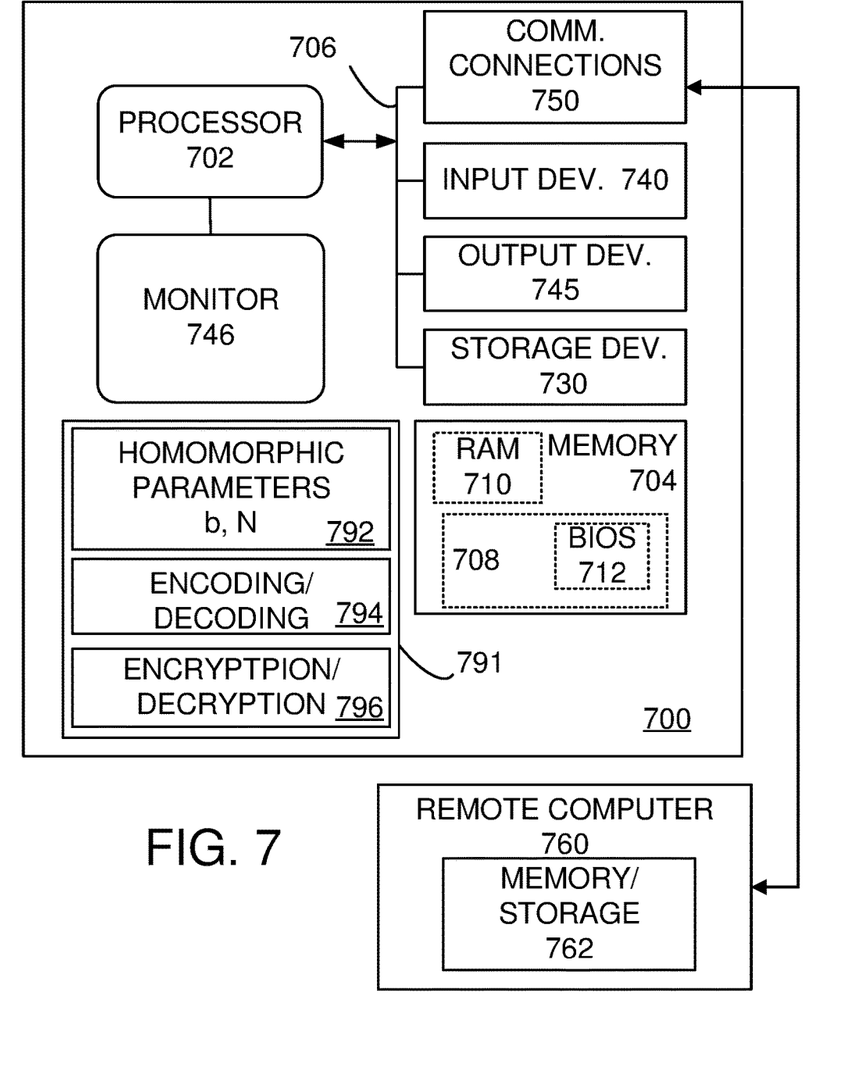
FIG. 7 illustrates an exemplary computing environment in which the disclosed technology may be implemented.

FIG. 7 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, an exemplary system for implementing the disclosed technology includes a general purpose computing device in the form of an exemplary conventional PC 700, including one or more processing units 702, a system memory 704, and a system bus 706 that couples various system components including the system memory 704 to the one or more processing units 702. The system bus 706 may be any of several types of bus structures including a memory bus or memory controller, a peripheral bus, and a local bus using any of a variety of bus architectures. The exemplary system memory 704 includes read only memory (ROM) 708 and random access memory (RAM) 710. A basic input/output system (BIOS) 712, containing the basic routines that help with the transfer of information between elements within the PC 700, is stored in ROM 708.

The exemplary PC 700 further includes one or more storage devices 730 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 706 by a hard disk drive interface, a magnetic disk drive interface, and an optical drive interface, respectively. The drives and their associated computer readable media provide nonvolatile storage of computer-readable instructions, data structures, program modules, and other data for the PC 700. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 730 including an operating system, one or more application programs, other program modules, and program data. A user may enter commands and information into the PC 700 through one or more input devices 740 such as a keyboard and a pointing device such as a mouse. Other input devices may include a digital camera, microphone, joystick, game pad, satellite dish, scanner, or the like. These and other input devices are often connected to the one or more processing units 702 through a serial port interface that is coupled to the system bus 706, but may be connected by other interfaces such as a parallel port, game port, or universal serial bus (USB). A monitor 746 or other type of display device is also connected to the system bus 706 via an interface, such as a video adapter. Other peripheral output devices, such as speakers and printers (not shown), may be included.

The PC 700 may operate in a networked environment using logical connections to one or more remote computers, such as a remote computer 760. In some examples, one or more network or communication connections 750 are included. The remote computer 760 may be another PC, a server, a router, a network PC, or a peer device or other common network node, and typically includes many or all of the elements described above relative to the PC 700, although only a memory storage device 762 has been illustrated in FIG. 7. The personal computer 700 and/or the remote computer 760 can be connected to a logical a local area network (LAN) and a wide area network (WAN). Such networking environments are commonplace in offices, enterprise wide computer networks, intranets, and the Internet.

When used in a LAN networking environment, the PC 700 is connected to the LAN through a network interface. When used in a WAN networking environment, the PC 700 typically includes a modem or other means for establishing communications over the WAN, such as the Internet. In a networked environment, program modules depicted relative to the personal computer 700, or portions thereof, may be stored in the remote memory storage device or other locations on the LAN or WAN. The network connections shown are exemplary, and other means of establishing a communications link between the computers may be used.

Having described and illustrated the principles of our invention with reference to the illustrated embodiments, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We therefore claim as our invention all subject matter that comes within the scope and spirit of these claims. Alternatives specifically addressed in these sections are merely exemplary and do not constitute all possible alternatives to the embodiments described herein.

We claim:

1. A secure communication system for accessing encrypted records via a wide area network, comprising:
   one or more processor devices that:
      receive a plaintext;
      represent the plaintext as a rational number x having a fractional part in an integer basis b as an integer obtained from a modular product of x and $b^n$ with respect to a modulus $b^n+1$, wherein n is a positive integer greater than 1 and b is an integer other than 0 or 1
      to produce an encoded plaintext; and
      based on the encoded plaintext, produce a corresponding ciphertext.

2. The secure communication system of claim 1, wherein n is a power of 2 and b is a positive integer.

3. The secure communication system of claim 1, further comprising expressing the plaintext as the rational number x based on a number of available digits determined by the positive integer.

4. The secure communication system of claim 1, further comprising expressing the plaintext as the rational number x by approximating the plaintext in the integer basis b.

5. The secure communication system of claim 1, wherein the one or more processor devices process the encoded plaintext to produce a polynomial representation of the encoded plaintext to produce the corresponding ciphertext based on the polynomial representation.

6. The secure communication system of claim 1, further comprising a network interface, wherein the one or more processor devices are coupled to provide the ciphertext to the network interface, and the network interface includes a wired or wireless transmitter that transmits the ciphertext.

7. The secure communication system of claim 2, wherein the one or more processor devices decode decrypted ciphertext so as to express the decrypted ciphertext as a rational number y having a fractional part in the integer basis b.

8. The secure communication system of claim 7, wherein the one or more processors processor devices are configured to decrypt a received ciphertext and decode the decrypted ciphertext so as to express the decrypted ciphertext as the rational number y having a fractional part in the integer basis b.

9. The secure communication system of claim 8, wherein the decrypted ciphertext is decoded based on a modular product of the decrypted ciphertext and an integer power of the base b with respect to the modulus $b^n+1$.

10. The secure communication system of claim 8, wherein, b is even, and the decrypted ciphertext is decoded based on a modular product of the decrypted ciphertext and $b^{n/2-1}$ with respect to the modulus $b^n+1$.

11. The secure communication system of claim 8, wherein, b is odd, and the decrypted ciphertext is decoded based on a modular product of the decrypted ciphertext and $b^{n/2}$ with respect to the modulus $b^n+1$.

12. The secure communication system of claim 8, wherein the one or more processor devices are configured to determine if b is even or odd, and decode the decrypted ciphertext based on the determination.

13. The secure communication system of claim 12, wherein, if b is even, the decrypted ciphertext is decoded based on a modular product of the decrypted ciphertext and $b^{n/2-1}$ with respect to the modulus $b^n+1$ and if b is odd, the decrypted ciphertext is decoded based on a modular product of the decrypted ciphertext and $b^{n/2-1}$ with respect to the modulus $b^n+1$.

14. A method, comprising:
   with a processor device:
      representing a plaintext as a rational number; and
      encoding the rational number as an integer by obtaining a modular product of the rational number and $b^n$ with respect to a modulus $b^n+1$, wherein n is an integer greater than 1 and b is an integer other than 0 or 1.

15. The method of claim 14, wherein n is a power of two and b is a positive integer.

16. The method of claim 14, representing the encoded rational number as a polynomial, and producing the ciphertext by homomorphic encoding.

17. The method of claim 14, further comprising decrypting a received ciphertext and decoding the decrypted ciphertext to produce a plaintext representation as a rational number having a fractional part in the integer basis b.

18. The method of claim 17, wherein the decrypted ciphertext is decoded based on a modular product of the decrypted ciphertext and an integer power of the base b with respect to the modulus $b^n+1$.

19. The method of claim 18, wherein, if the base b is even, and the decrypted ciphertext is decoded based on a modular product of the decrypted ciphertext and $b^{n/2-1}$ with respect to the modulus $b^n+1$.

20. The method of claim 18, wherein b is odd, and the decrypted ciphertext is decoded based on a modular product of the decrypted ciphertext and $b^{n/2}$ with respect to the modulus $b^n+1$.

21. The method of claim 15, further comprising determining if b is even or odd, and decoding the decrypted ciphertext based on the determination.

22. A method, comprising, in a processor device:
representing a plaintext as a rational number x;
encoding the rational number x as an integer obtained from a modular product of the rational number x and $b^n$ with respect to a modulus $b^n+1$, wherein n is a power of 2, b is a positive integer basis representing the encoded rational number as a polynomial;
homomorphically encrypting the plaintext based on the polynomial representation of the encoded rational number;
transmitting the encrypted plaintext over a network connection;
decrypting a received ciphertext;
determining if the base b is even or odd; and
decoding the decrypted ciphertext based on a modular product of the decrypted ciphertext and an integer power of the base b with respect to the modulus $b^n+1$ to produce a rational number y that represents a plaintext, wherein, if the base b is even, the integer power is n/2−1 and if the base b is odd, the integer power is n/2.

* * * * *